Nov. 19, 1957   D. W. DRISKEL ET AL   2,813,518
FLUID ACTUATOR WITH INTEGRAL MECHANICAL LOCKING MEANS
Filed March 29, 1954   2 Sheets-Sheet 1

DON W. DRISKEL
RICHARD L. HAYMAN
INVENTORS

BY Lyon & Lyon
ATTORNEYS

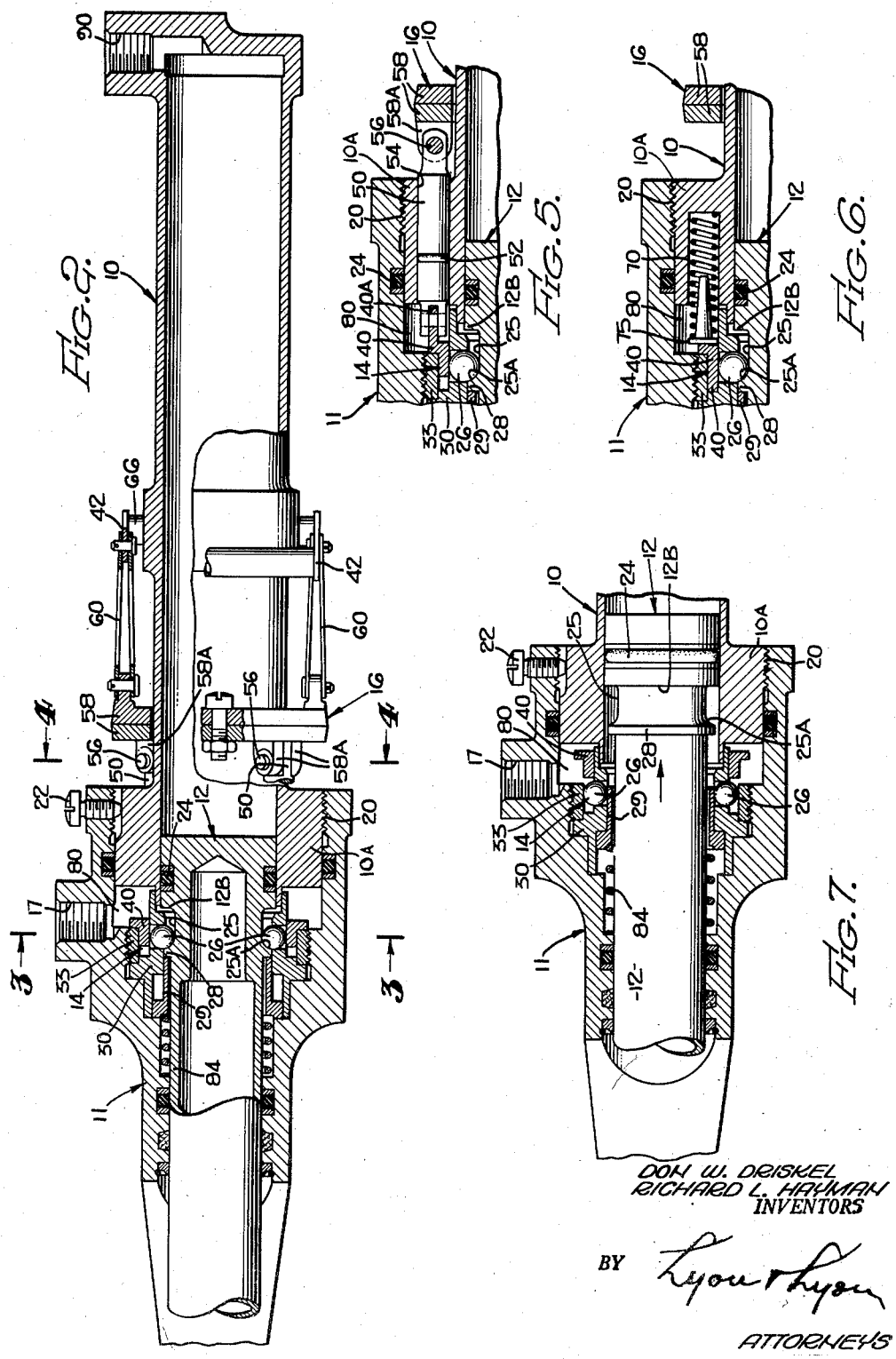

United States Patent Office 2,813,518
Patented Nov. 19, 1957

2,813,518

FLUID ACTUATOR WITH INTEGRAL MECHANICAL LOCKING MEANS

Don W. Driskel, Glendale, and Richard L. Hayman, Flintridge, Calif., assignors to Haskel Engineering Associates, Glendale, Calif., a copartnership Application March 29, 1954, Serial No. 419,463

2 Claims. (Cl. 121—40)

The present invention relates to improvements in hydraulic or pneumatic actuators and more specifically to means for automatically locking an element thereof in an operative position after movement of such element, and in general, the arrangement disclosed herein constitutes an improvement in that type of actuator described and claimed in our copending application for patent, Ser. No. 241,472 filed August 11, 1951, (now abandoned) and in a divisional application thereof, Ser. No. 388,408 filed October 26, 1953, now United States Patent 2,713,328.

Hydraulic or pneumatic actuators of this character include a piston slidably mounted in a cylinder. The piston is moved to different operating positions in accordance with fluid, either air, oil, or the like, being applied under pressure to the cylinder. The present invention contemplates the provision of an improved mechanism disposed entirely in the cylinder for locking the piston in one of its operating positions. Such locking mechanism is automatically released upon application of pneumatic or fluid pressure to the cylinder, or, alternatively such unlocking may be accomplished by associated manually operated mechanical means.

One of the objects of the present invention is to provide an improved hydraulic or pneumatic actuator of this character which incorporates improved locking means.

A specific object of the present invention is to provide an improved actuator of this character which uses one or more balls for the intended purpose of rigidly locking the piston with respect to the cylinder so as to prevent relative movement between the piston and the cylinder.

Another object of the present invention is to provide an actuator with an improved locking mechanism therein, such locking mechanism being actuated hydraulically when the applied pressure is above a predetermined high threshold value whereby the locking mechanism is prevented from operating spuriously in accordance with, e. g., surges in pressure of the actuating fluid.

Another object of the present invention is to provide an actuator of the character outlined in the preceding paragraph which also incorporates means whereby the mechanism may be released from its locked condition upon manual operation of an associated mechanism which does not require the pressure of hydraulic fluid.

Another object of the present invention is to provide an improved actuator of this character particularly useful where such actuator is subject to high inertia forces.

Another object of the present invention is to provide an improved arrangement of the character outlined in the preceeding paragraph where the results indicated therein are obtained by mounting the movable parts of the lock in a relatively stationary end cap instead of on the piston rod as described in our two above mentioned pending patent applications.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a sectional view taken substantially on the line 2—2 in Figure 1.

Figure 4:
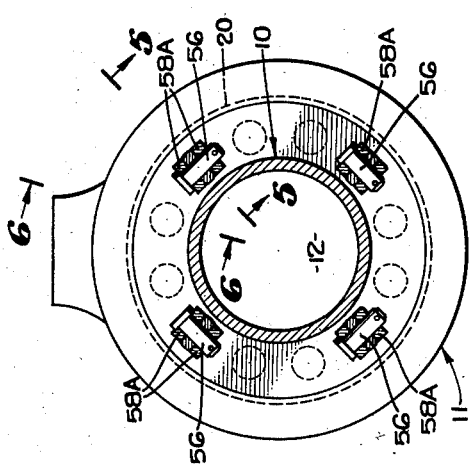
Figure 3:
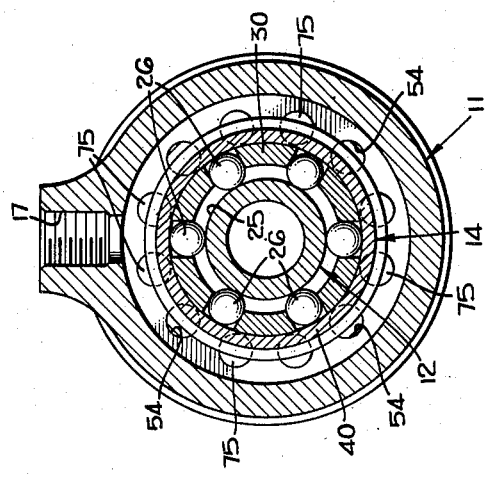

Figures 3 and 4 are sectional views taken substantially on lines 3—3 and 4—4 in Figure 2.

Figures 5 and 6 are sectional views taken substantially on the lines 5—5 and 6—6 in Figure 4.

Figure 7 is a sectional view corresponding to the sectional view illustrated in Figure 2, but with the piston shown in its unlocked position while moving in the direction indicated by the arrow in Figure 7.

In general, the actuator includes a two piece cylinder 10, 11, within which the piston 12 is slidable, the cylinder elements 10 and 11 are screw threaded together with the cylinder element 11 containing means indicated by the general reference numeral 14 for locking the piston at one end of its travel as shown in Figure 2 and with the other cylinder element 10 slidably mounting a two piece ring 16, which may be manually moved to unlock the locking means 14; or such locking means 14 is automatically unlocked upon application of pressure to the fluid inlet 17 in the cylinder assembly.

For these general purposes the cylinder elements 10 and 11 are screw threaded together as indicated at 20, and maintained against relative movement by the locking screws or bolts 22. It is noted that the cylinder element 11 is essentially an end cap for the elongated cylinder element 10. The cylinder element 10 has formed on one end thereof an enlarged flange or hub portion 10A which is externally threaded as indicated at 20 and, as described in detail later in connection with Figures 5 and 6, is provided with a plurality of circumferentially arranged and axially extending bores for receiving springs 70 (Figure 6) and pistons 50 (Figure 5).

Piston 12 is of relative simple construction compared to the constructions shown in our aforementioned patent applications and it is observed that it includes no moving parts. More specifically, the piston 12 is provided with a recessed packing or gasket ring 24, reentrant means in the form of an annular groove 25, the walls of which cooperate with the series of balls 26 for locking purposes; and also, the piston 12 includes an annular shoulder 28 for purposes of moving the ball retaining sleeve 29, in operation of the locking means as described in greater detail below.

The series of balls 26, which are six in number as shown in Figure 3 are permitted to move radially outwardly and inwardly with respect to the axis of piston 12 in corresponding apertures in the ball guide 30, such ball guide 30 comprising an annular member which is stationarily mounted in the cylinder element 11, between, on the one hand, an internal shoulder on such cylinder 11, and the retaining ring 33 which is threaded internally of the cylinder element 11 as shown in Figure 2.

Radial outward movement of such series of balls 26 is limited either by the locking ring 40 in the locked position of the apparatus as illustrated in Figure 2 or alternatively by the aforementioned retaining ring 33 as illustrated in Figure 7, showing the unlocked condition of the locking means.

Figure 1:
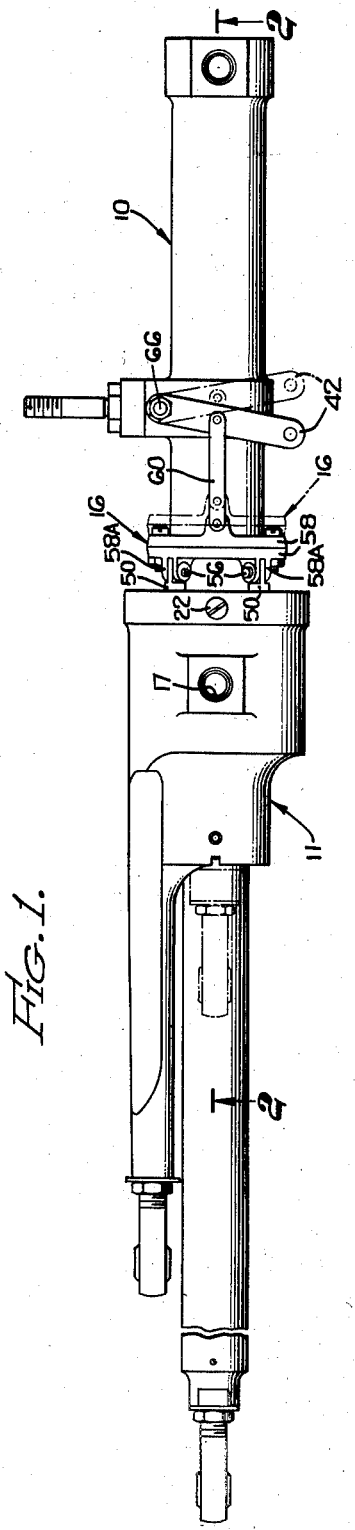
Figure 1 is a view in side elevation of an improved actuator embodying features of the present invention.

The locking ring 40 may be moved from its locking position in Figure 2 to its unlocked position shown in Figure 7 either by the application of hydraulic pressure to the conduit or inlet 17 or by mechanical manual operation of the pivoted lever 42 which is movable between the two positions illustrated in Figure 1.

For this purpose the locking ring 40 which is a ring having a generally L-shaped cross section as shown in Figure 2 is provided with four equally circumferentially spaced ears 40A as illustrated in Figure 5, to each of which ears is pin connected a piston 50, such piston 50 being provided with a packing ring 52 and extending completely through a corresponding cylinder bore 54 in the flanged portion 10A of the cylinder element 10. Those ends of the pistons 50 which extend outwardly on the cylinder assembly are pin connected by means of pins 56 to each of four circumferentially spaced ears 58A on a two piece collar 58. Collar 58 is slidably mounted on the cylinder element 10.

This two piece collar 58, as shown in Figure 1, is link connected by means of link 60 to an intermediate point on the lever 42, such lever 42 being pivotally mounted about the axis of the pivot pin 66 on the cylinder element 10. Outward movement of the piston 50 is limited, of course, by engagement of the ring 40 with the internal spaced wall of the cylinder element 10; and such locking ring 40, however, is normally biased to the left in Figure 2 by 8 circumferentially arranged pre-stressed coil compression springs 70 illustrated in Figure 6.

As shown in Figure 6 the series of circumferentially arranged springs 70 are disposed within blind bores in the flanged portion 10A of the cylinder element 10 with one end thereof abutting the cylinder flanged portion 10A and the other end thereof abutting the tapered washer 75, such washer 75 being pressed by the spring 70 into constant engagement with the locking ring 40 to thereby normally bias such locking ring 40 towards its locking position carrying, of course, with it the aforementioned collar 58 to its full line position illustrated in Figure 1.

It is observed that the fluid inlet 17 is in communication with the annular space 80 (Figure 2) and such annular space 80 is, of course, in communication with each of the pistons 50 illustrated in Figure 5 so that the pressure in such annular chamber 80 is effective to move the piston 50 to the right in Figure 5 carrying the locking ring 40 from its locking position against the action of the six coil compression springs 70 (Figure 6).

When this occurs the series of locking balls 26 are no longer retained by the ring 40 and such balls are then free to move radially outwardly, and indeed, such series of balls are cammed radially outwardly by the curved wall 25A defining the annular groove 25 upon subsequent movement of the piston 12 to the right in Figure 2. Such movement of the piston 12 results automatically from the application of the same fluid pressure to chamber 80, the fluid in such instance flowing from chamber 80 and through the ball guiding apertures in the stationary annular ball guide 40, and act on the annular shoulder 12B of piston 12 to cause movement of the piston 12.

While the body of the piston 12 may be used to maintain the series of balls 26 in its radial outer position, preferentially the spring biased ball retaining ring 29 is used for the purpose. The ball retaining ring or sleeve 29 is normally biased to the right in Figure 2 by the pre-stressed coil compression spring 84 having one of its ends abutting an internal shoulder on the cylinder element 11 and the other one of its ends bearing against the sleeve 29 which is of generally L-shaped cross section as shown, so that it may abut an annular shoulder on the ball guide 30 as shown in Figure 7 to limit movement of the sleeve 29 when it is in a position as shown in Figure 7, to confine a series of balls 26 in their outward position. In the locked position, as shown in Figure 2, the motion of the sleeve 29 is limited by its engagement with the shoulder 28 on the piston 12.

In operation of the device described, assuming that the device is in its locked position illustrated in Figure 2, application of fluid pressure to the inlet 17 results in movement of the series of pistons 50 to the right carrying with them the ring 40 so as to allow the series of balls 26 to move radially outwardly. At the same time, fluid flowing past the series of balls 26 acts on the shoulder 12B of the piston 12 to cause the piston 12 to move to the right. During initial movement of the piston 12 to the right the spring biased sleeve 29 follows movement of the piston 12 and ultimately reaches the position illustrated in Figure 7, wherein such sleeve 29 prevents radial inward movement of the series of balls 26. Instead of using hydraulic fluid, as mentioned herein, to unlock the structure, the structure may be unlocked by applying a force to the lever 42 in Figure 1 to move it to its dotted line position to cause movement of the ring 16 to its dotted line position, and movement of the connected sleeve 40 to the right in Figure 2 against the action of the series of coil compression sprinngs 70 (Figure 6); thus, the piston 12 may be moved to the right. To return the piston to its locked condition the fluid pressure in chamber 80 is relieved and fluid under pressure is introduced into the inlet 90 in the cylinder element 10 to cause the piston 12 to move to the left. When and as the piston 12 approaches its position, wherein it is ultimately locked, the shoulder 28 on the piston engages the sleeve 29 to move it to the left against the action of the spring 84 thereby allowing the series of balls 26 to enter the annular piston groove 25, and indeed, such balls enter such groove being moved therein by the ring 40 which is being constantly urged to the left by the aforementioned pre-stressed coil springs 70 (Figure 6). After the series of balls 26 enters the piston groove 25 the spring biased ring 40 moves into its position illustrated in Figure 2 to confine the balls in the piston groove 25 and to thereby lock the piston with respect to the cylinder assembly.

It is noted that the pressure that is required to unlock the piston from the cylinder must be of a predetermined high intensity which is sufficiently high to overcome the force exerted by the pre-stressed springs 70. Thus, pressure surges in the line below such predetermined high intensity are ineffective to unlock the mechanism.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a fluid pressure cylinder including an elongated cylinder element and an end cap for the same, said elongated cylinder element having an enlarged flanged portion on one end thereof, said flanged portion having an externally threaded portion cooperating with an internally threaded portion of said end cap, said end cap having an internal shoulder portion, an annular ball guide engaging said shoulder portion and having a plurality of circumferentially spaced apertured portions, a ball in each of said apertured portions, a retaining ring internally threaded in said end cap and engaging said ball guide to retain the same stationarily against said shoulder portion, a ball locking ring encircling a portion of said ball guide and being slidable thereon to retain, in one position thereof, said balls in said apertured portions, said enlarged flanged portion having a plurality of spaced and circumferentially disposed blind bores therein, a coil compression spring in each of said bores and biasing said ball locking ring towards said one position, said ball locking ring being pressed by each of said springs against said retaining ring when said ball locking ring is in said one position, said flanged portion having a series of spaced and circumferentially disposed apertured portions extending through said flanged portion, a piston in and extending outwardly of each of the last mentioned apertured portions, each piston being connected at its inner end to said retaining ring, an actuating ring encircling said elongated cylindrical portion and having spaced portions thereof connected to the outwardly extending ends of each of said pistons, manually operable means mounted on said elongated cylinder and connected to said actuating ring for moving said pistons and the ball locking ring connected thereto away from said one position and against the force exerted by said springs, a fluid channel formed in said end cap, said channel being in communication with the inner ends of said pistons and the apertured portions in said ball guide, said ball locking ring when in said one position at least partially blocking the flow of fluid from said channel to said ball guide apertured portions, a piston slidably mounted in said elongated cylinder element and having an annular grooved portion into which said balls may extend to lock the piston to the end cap when said locking ring is in said one position.

2. An arrangement as set forth in claim 1 including a ball retaining sleeve extending within said ball guide and slidable thereon into engagement with a shoulder portion of said ball guide, a coil compression spring having one of its ends engaging a portion of said end cap and the other one of its ends engaging said sleeve to urge said sleeve against the last mentioned shoulder portion and to position said sleeve so as to close the inner ends of said ball guide apertured portions and retain the balls therein between said sleeve and said retaining ring when said ball locking ring is away from said one position.

References Cited in the file of this patent

UNITED STATES PATENTS

| | | |
|---|---|---|
| 2,393,962 | Ashton | Feb. 5, 1946 |
| 2,434,828 | Ashton | Jan. 20, 1948 |
| 2,713,328 | Driskel et al. | July 19, 1955 |

FOREIGN PATENTS

| | | |
|---|---|---|
| 341,511 | Italy | June 27, 1941 |
| 573,033 | Great Britain | Nov. 2, 1945 |